Patented June 24, 1930

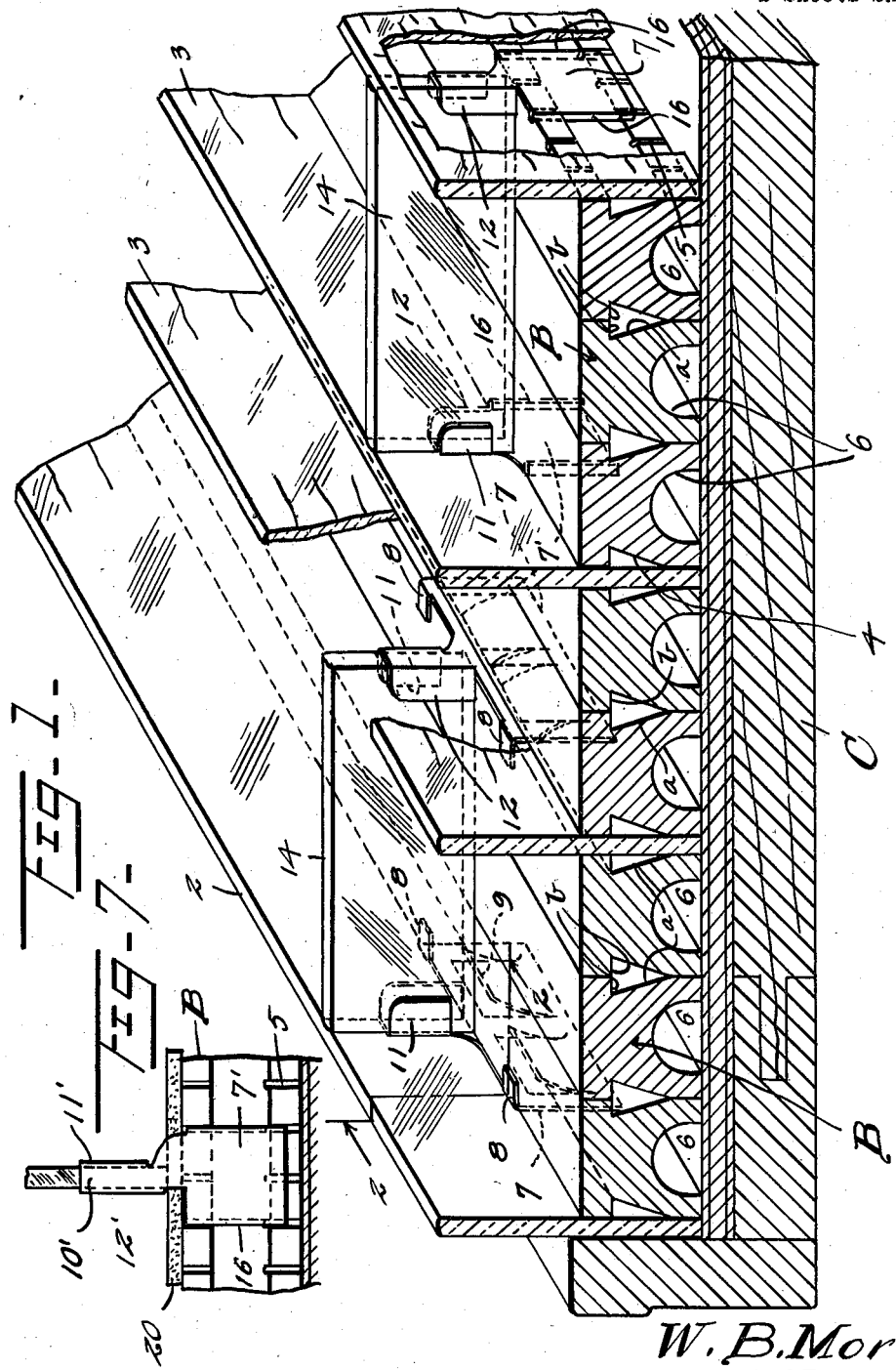

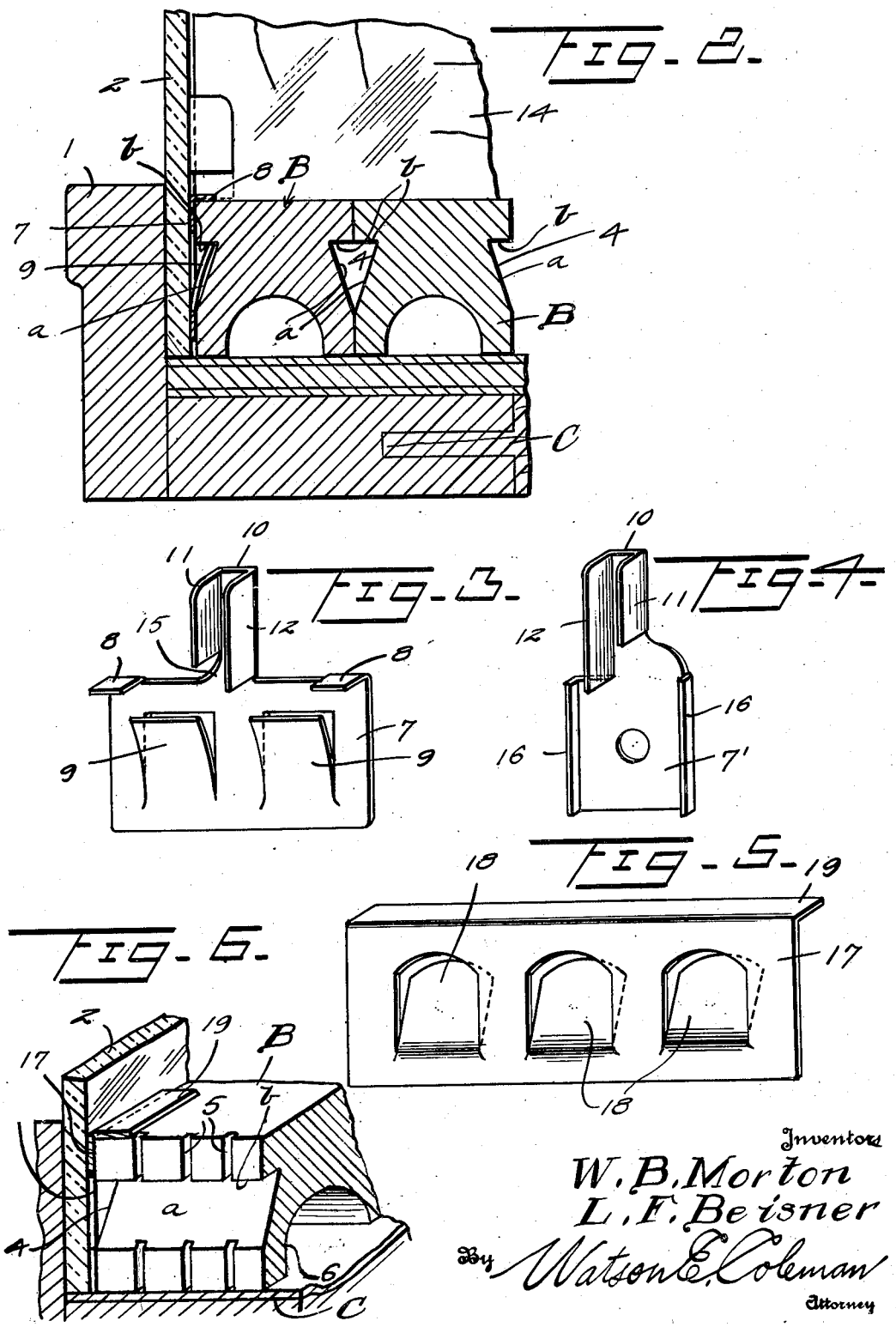

1,765,935

UNITED STATES PATENT OFFICE

WILLIAM B. MORTON AND LAWRENCE F. BEISNER, OF BEATRICE, NEBRASKA

DISPLAY EQUIPMENT

Application filed August 15, 1929. Serial No. 386,029. REISSUED

This invention relates to a display equipment and it is an object of the invention to provide an equipment of this kind which makes possible quick installation and adjustment of bins for merchandise displays on counters or wherever the adjustable bin method of display is desirable.

Another object of the invention is to provide an equipment of this kind including holders adapted to have effective engagement with partition strips or the like to maintain the same in desired adjusted position and wherein is afforded means to assure a true alignment of the partition strips.

It is also an object of the invention to provide a device of this kind comprising a plurality of separate blocks or shams in which are adapted to be operatively arranged holders for divider plates together with means serving to assure a tight assembly of the various parts.

A particular advantage of the invention is to provide an equipment of this kind which, when assembled, comprises a relative mounting of parts which serves to materially prevent breakage of glass especially as caused by customers or the like leaning against the glass.

The invention consists in the details of construction and in the combination and arrangement of the several parts of our improved display equipment whereby certain important advantages are attained and the device rendered simpler, less expensive and otherwise more convenient and advantageous for use than devices at present available, as will be hereinafter more fully set forth.

The novel features of our invention will hereinafter be definitely claimed.

In order that our invention may be the better understood, we will now proceed to describe the same with reference to the accompanying drawings, wherein:—

Figure 1 is a fragmentary view partly in perspective and partly in section illustrating an equipment constructed in accordance with an embodiment of our invention and in relative assembled relation;

Figure 2 is a sectional view taken substantially on the line 2—2 of Figure 1;

Figure 3 is a view in perspective of a holder adapted for use with a divider strip;

Figure 4 is a view in perspective of a further form of divider or partition holder;

Figure 5 is a view in perspective of a spacer or wedge member as herein employed;

Figure 6 is a fragmentary view partly in section and partly in perspective illustrating a spacer or wedge member in applied or working position;

Figure 7 is a fragmentary elevational view with portions in section illustrating a still further embodiment of the invention.

As disclosed in the accompanying drawings, C denotes a counter, shelf or other surface with which our improved equipment may be employed and wherein each marginal portion of said counter or surface is defined by an upstanding flange 1 against the inner face of which a marginal band or strip 2 of glass or any material desired is adapted to engage. Snugly resting on the top surface of the counter C or the like are the elongated blocks or shams B between adjacent blocks or shams of which at desired points are adapted to be placed partitions 3 of glass or other desired material.

As herein disclosed, each of the blocks or shams B has its top flat and disposed along its side faces the grooves 4, said grooves being of an undercut type as particularly illustrated in Figures 2 and 6 with the inner wall of each of the grooves disposed on a downward and outward incline, as indicated at $a$, with the top wall of each of the grooves substantially parallel with the top flat face of the block or sham B. These grooves 4 in the sides of the blocks or shams B are relatively large for the purpose of reducing shipping weight and said side faces of the blocks or shams B are provided therealong with the vertically disposed slots 5 properly spaced for a purpose to be hereinafter referred to.

Each of the blocks or shams B is of a general design to make possible machine production at high speed and at the same time to materially reduce the shipping weight, and for which reason the under surface of each of the blocks or shams B has extending therealong a relatively deep groove or channel 6 resulting in the bottom of the block or sham B having two-point bearing.

In Figure 3 of the accompanying drawings, we particularly illustrate a holder for a divider strip or partition of glass or other desired material and which comprises a plate 7 of desired material which is adapted to be engaged between an applied partition plate or divider 2 and a block or sham B with the laterally disposed flanges 8 at opposite upper corners of the plate 7 in close contact with the upper surface of the associated block or sham B. These flanges 8 are to give the holder a solid bearing and to keep the top of the holder in desired alignment. The plate 7 has sprung or struck out therefrom the lips or spring plates 9 which are received within the grooves 4 in the adjacent side face of the block or sham B.

By this means the holder, as illustrated in Figure 3, is effectively held against displacement, yet may be readily slid along its associated block or sham B to bring the same to a desired adjusted or selected position. The upper marginal portion of the plate 7 as substantially midway its ends is provided with the upstanding plate 10 coplanar with the plate 7 and having its side marginal portions substantially defined by the transversely spaced flanges 11 and 12 disposed in the same general direction as the lips or spring plates 9. These flanges 11 and 12 are adapted to receive therebetween an end portion of a supplemental or bin partition 14. As herein disclosed, the flange 11 terminates at a point spaced above the plate 7 in order to permit the lower side portion of the plate 10 to be rounded or otherwise formed to provide a reinforcing or strengthening web 15.

In the embodiment of the invention as illustrated in Figure 4, the holder is constructed in substantially the same manner as the one illustrated in Figure 3 except that the body plate 7' has its side marginal portions defined by laterally disposed flanges 16 spaced apart one with respect to the other a distance sufficiently to have ready and accurate reception within selective vertical slots 5 in a side face of a block or sham B. The holder as illustrated in Figure 4 is used in the production of such compartments requiring a more positive holding of the dividing or partition plates 14.

The plates 7 or 7' of the holders, as illustrated in Figures 3 or 4, are readily insertible between adjacent partition or dividing plates 2 and an applied block or sham B, or when required directly between two adjacent blocks or shams B.

In Figure 5, we illustrate a spacer or wedge member which, as herein disclosed, comprises a plate 17 of desired dimensions having struck out therefrom the spring lips or plates 18 which are adapted to bear directly against an end of a block or sham B. The upper marginal portion of the plate 17 is defined by a substantially perpendicularly related flange 19 which is adapted to overlie the top surfaces of adjacent blocks or shams B when the spacer or wedge member is in applied or working position. The spacer or wedge plate is employed to maintain tight the desired assembly of our improved equipment.

In practice, all blocks or shams B, band plates 2, partition plates 3 and 14 and associated counter tops or the like are subject to slight variation in size in the process of manufacture and also it is desired to have the parts of the equipment made slightly scant in size to permit of easy installation. After displays have been assembled and it is desired that the equipment be wedged to hold the dividers or the like in upright position, spacers or wedge plates may be applied where it is believed they will be the most effective.

The spacers when used also serve an important function to hold the glass bands 2 and the like with a spring tension so that upon undue pressure being exerted upon the bands 2 the same will tilt but will spring back into place again when the pressure is relieved. This is of especial advantage as it materially reduces the liability of the breakage of glass and the like of which the bands 2 may be made.

In the embodiment of our invention as illustrated in Figure 7, both of the flanges 11' and 12' terminate away from the lower or bottom end of the plate 10'. This is of advantage as it permits the use of a felt pad 20 upon the top surface of the assembled blocks or shams B.

It is also to be understood that the various parts of our improved equipment can be altered as to size and such parts can be used singly, collectively or in combinations made possible by the desired designs. As it is believed obvious the strip glass and counter tops and wood guard rail are in common use and that our improved equipment is designed for use with such strip glass and counter tops, said equipment being of a character to permit the various holders to be installed without disturbing existing displays.

It is also believed to be obvious that the holders can be inserted and used repeatedly without injuring or marring the blocks or shams B by reason of the fact that no screws, teeth, claws, indentations or corrugations are required to hold the same in position.

From the foregoing description it is thought to be obvious that a display equipment constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A display equipment for counters and the like comprising a plurality of elongated grooved blocks arranged side by side, partitions extending between adjacent blocks and terminating thereabove, supplemental plates positioned above the blocks and disposed transversely thereof, and holders for said supplemental plates in locking engagement with grooved faces of the blocks.

2. A display equipment for counters and the like comprising a plurality of elongated grooved blocks arranged side by side, partitions extending between adjacent blocks and terminating thereabove, supplemental partitions transversely positioned on said blocks, a holder for each end portion of a supplemental partition, said holder comprising a plate overlying a side face of a block and extending into the grooved portion thereof whereby to lock said plate on said block, an upstanding plate carried by said first named plate and having side flanges between which an end portion of a supplemental partition is received.

3. In a counter display equipment comprising a plurality of blocks arranged side by side, each of said blocks having grooves disposed along the side faces thereof, a spacer plate having a flange engageable with one of the blocks from above, and spring plates carried by the spacer plate for engagement within a groove of a block.

4. In a display equipment for counters comprising a series of elongated blocks arranged side by side between vertically disposed members thereby supporting said members in vertical position, each of said blocks having registering grooves in opposite faces thereof.

5. In a display equipment for counters comprising a series of elongated blocks arranged side by side between vertically disposed members whereby to support said members in vertical position, each of said blocks having grooves extending lengthwise thereof in opposite faces, each side face having a series of longitudinally spaced slots disposed substantially at right angles to the grooves.

In testimony whereof we hereunto affix our signatures.

WILLIAM B. MORTON.
LAWRENCE F. BEISNER.